United States Patent
Mulligan

(10) Patent No.: US 8,966,155 B1
(45) Date of Patent: Feb. 24, 2015

(54) SYSTEM AND METHOD FOR IMPLEMENTING A HIGH PERFORMANCE DATA STORAGE SYSTEM

(75) Inventor: Daniel P. Mulligan, Austin, TX (US)

(73) Assignee: Daniel P. Mulligan, Austin, TX (US)

( * ) Notice: Subject to any disclaimer, the term of this patent is extended or adjusted under 35 U.S.C. 154(b) by 466 days.

(21) Appl. No.: 12/415,574

(22) Filed: Mar. 31, 2009

Related U.S. Application Data

(60) Provisional application No. 61/072,545, filed on Apr. 1, 2008.

(51) Int. Cl.
G06F 12/00 (2006.01)

(52) U.S. Cl.
USPC ............ 711/103; 711/156; 711/206; 711/163

(58) Field of Classification Search
USPC .................................. 711/103, 156, 163, 206
See application file for complete search history.

(56) References Cited

U.S. PATENT DOCUMENTS

| | | | | |
|---|---|---|---|---|
| 2004/0186946 | A1* | 9/2004 | Lee ............................... | 711/103 |
| 2007/0016719 | A1* | 1/2007 | Ono et al. ..................... | 711/103 |
| 2007/0168698 | A1* | 7/2007 | Coulson et al. ................... | 714/5 |
| 2009/0164702 | A1* | 6/2009 | Kern .............. | 711/103 |
| 2009/0172257 | A1* | 7/2009 | Prins et al. .................... | 711/103 |

OTHER PUBLICATIONS

Kaist C.A. Lab: A Survey of Flash Translation Layers, CS710: Topics in Computer Architecture Embedded Systems (Spring 2004); Computer Architecture Lab, pp. 1-12.
Intel: Understanding the Flash Translation Layer (FTL) Specification, AP-684 Application Note, Order No. 297816-002, Dec. 1998, pp. 1-20.
Raatikainen, Kimmo: Performance of Issues in Mobile Computing and Communications: Flash Memories: Department of Computer Science, Sep. 24, 2007, pp. 1-31.
Choudhuri, Siddharth and Givargis, Tony: Performance Improvement of Block Based NAND Flash Translation Layer, 2007, pp. 1-6.
Birrell, Andrew et al.: A Design for High-Performance Flash Disks, Microsoft Research—Silicon Valley, Apr. 2007, pp. 1-6.
Samsung: Specification, DS_K9F8GO8UXM_rev. 10, Flash Memory, pp. 1-54.
Samsung: Specification, DS_K9XXGOUXM_0 7, Advance Flash Memory, pp. 1-45.
Hynix Semiconductor, et al.: ONFI: Open NAND Flash Interface Specification, Ref. 2.1, Jan. 14, 2009, pp. 1-206.

* cited by examiner

Primary Examiner — Kalpit Parikh

(57) ABSTRACT

A method, apparatus, and computer program product for implementing a high-performance data storage device using block-access memory devices are disclosed. According to an embodiment of the present invention, a storage device includes a block-access memory device configured to stored data in one or more physical sector addresses and a random-access memory device storing a logical-to-physical (L2P) sector address translation data structure. Also, the storage device includes a device manager, coupled to both the block-access memory device and the random-access memory. The device manager is configured to determine a physical sector address in the block-access memory device, in response to a data access request, wherein the data access request includes a logical sector address by mapping the logical sector address to a physical sector address using the L2P sector address translation data structure.

23 Claims, 16 Drawing Sheets

Logical-To-Physical (L2P) Table 205

| Logical Sector Address Field 405 | Status Field 410 | Physical Sector Address Field 415 | Cache Sector Address Field 420 | Semaphore Field 425 | Usage Field 430 |
|---|---|---|---|---|---|
| Entry 435 | | | | | |
| | | | | | |
| . . . | . . . | . . . | . . . | . . . | . . . |
| | | | | | |

| Logical Sector Address Field 405 | Status Field 410 | Physical Sector Address Field 415 | Cache Sector Address Field 420 | Semaphore Field 425 | Usage Field 430 |
|---|---|---|---|---|---|
| Entry 435 | | | | | |
| ... | ... | ... | ... | ... | ... |

Logical-To-Physical (L2P) Table 205

*Figure 4*

| Physical Sector Address Field 505 | Status Field 510 | Logical Sector Address Field 515 | Semaphore Field 525 | Usage Field 530 |
|---|---|---|---|---|
| Entry 535 | | | | |
| ... | ... | ... | ... | ... |

Physical-To-Logical (P2L) Table 210

*Figure 5*

| Cache Sector Address Field 605 | Status Field 610 | Logical Sector Address Field 615 | Semaphore Field 620 | Usage Field 625 |
|---|---|---|---|---|
| Entry 630 | | | | |
| ... | ... | ... | ... | ... |

Cache Table 220

*Figure 6*

SYSTEM AND METHOD FOR IMPLEMENTING A HIGH PERFORMANCE DATA STORAGE SYSTEM

RELATED APPLICATIONS

This application claims the benefit, under 35 U.S.C. §119 (e), of U.S. Provisional Application No. 61/072,545, filed Apr. 1, 2008, entitled "System and Method For Creating a High Performance Data Storage System Using Flash Memory," and naming Daniel P. Mulligan as inventor. The above-referenced application is hereby incorporated by reference herein in its entirety as if completely and fully set forth herein.

FIELD OF THE INVENTION

The present invention relates in general to the field of data processing systems, and more particularly, the present invention relates to a data storage system in a data processing system environment.

DESCRIPTION OF THE RELATED ART

Some modern computer systems handle transmission, processing, and/or storage of very large quantities of data on a daily basis. As demand for the availability and quantity of information increases, modern computer systems such as, for example, server systems, require increasingly large amounts of storage to handle the data. As storage capacity of a particular type of storage device increases, the access latency of the particular type of storage device also increases. For example, a cache memory, such as a microprocessor cache memory, can store and retrieve data very rapidly, but the storage capacity of a microprocessor cache memory can be very small. On the other hand, while a magnetic hard disk drive can have a large storage capacity relative to a cache memory, access latency of a magnetic hard disk drive is significantly slower than the access latency of a cache memory. Not only do magnetic hard disk drives restrict overall performance of a computer due to the access latency, such drives are fragile and prone to failure due to the number of moving parts required to implement the magnetic hard disk drives. A solid state drive (SSD) can be used to address both the mechanical and latency shortcomings of the magnetic hard disk drives. An example of a typical SSD, having no moving parts, is a flash drive implemented with NAND flash memory, which is a type of block-access memory.

Some implementations of block-access memory suffer from various performance limitations. For example, block-access (e.g., NAND flash memory) memory requires that data be written to or read from the block-access memory in specific pages, or a predefined block of memory locations. Block-access memory pages can fail, which requires that a failed page be marked as defective and tracked so as not be used for subsequent data storage. Data stored in a bad page or data about to be written to the bad page must be moved to a different, valid page within the block-access memory.

Data stored in a block-access memory typically cannot be directly overwritten. To overwrite data stored in a page, the page must first be erased, and then subsequently written with new data. Some implementations of block-access memory do not allow just a single page to be erased. Erase operations can require that groups of adjacent pages, referred to as an "erase block," be erased at one time. Thus, if valid data is stored in some pages of an erase block, this valid data must first be written to other locations within the block-access memory before the erase operation is executed, which further diminishes performance of the block-access memory.

These limitations of block-access memory force a storage system based on block-access memory to place data at various physical locations within the block-access memory and to be able to move the data from one physical location to another, without the intervention of or knowledge of a host computer. A block-access memory-based storage system also keeps track of the physical sector address of where every piece of data is stored within the storage system. Since a host computer using a block-access memory-based storage system will refer to data using logical sector addresses, the storage system provides some sort of logical-to-physical sector address translation in order to service data access requests from the host computer. These logical-to-physical sector address translations are provided by a flash translation layer (FTL). Some implementations of FTLs significantly degrade the performance of a data storage system especially from the relocation of data from one physical sector address to another to accommodate data write requests in the data storage system. Thus, there is a need for an improved system and method for implementing a high-performance block-access memory data storage system.

BRIEF DESCRIPTION OF THE DRAWINGS

The present invention may be better understood, and its numerous objects, features and advantages made apparent to those skilled in the art by referencing the accompanying drawings.

FIG. 4 is an embodiment of a logical-to-physical (L2P) table as shown in FIG. 2.

FIG. 5 is an embodiment of a physical-to-logical (P2L) table as shown in FIG. 2.

FIG. 6 is an embodiment of a cache table as shown in FIG. 2.

DETAILED DESCRIPTION

Introduction

Figure 1:
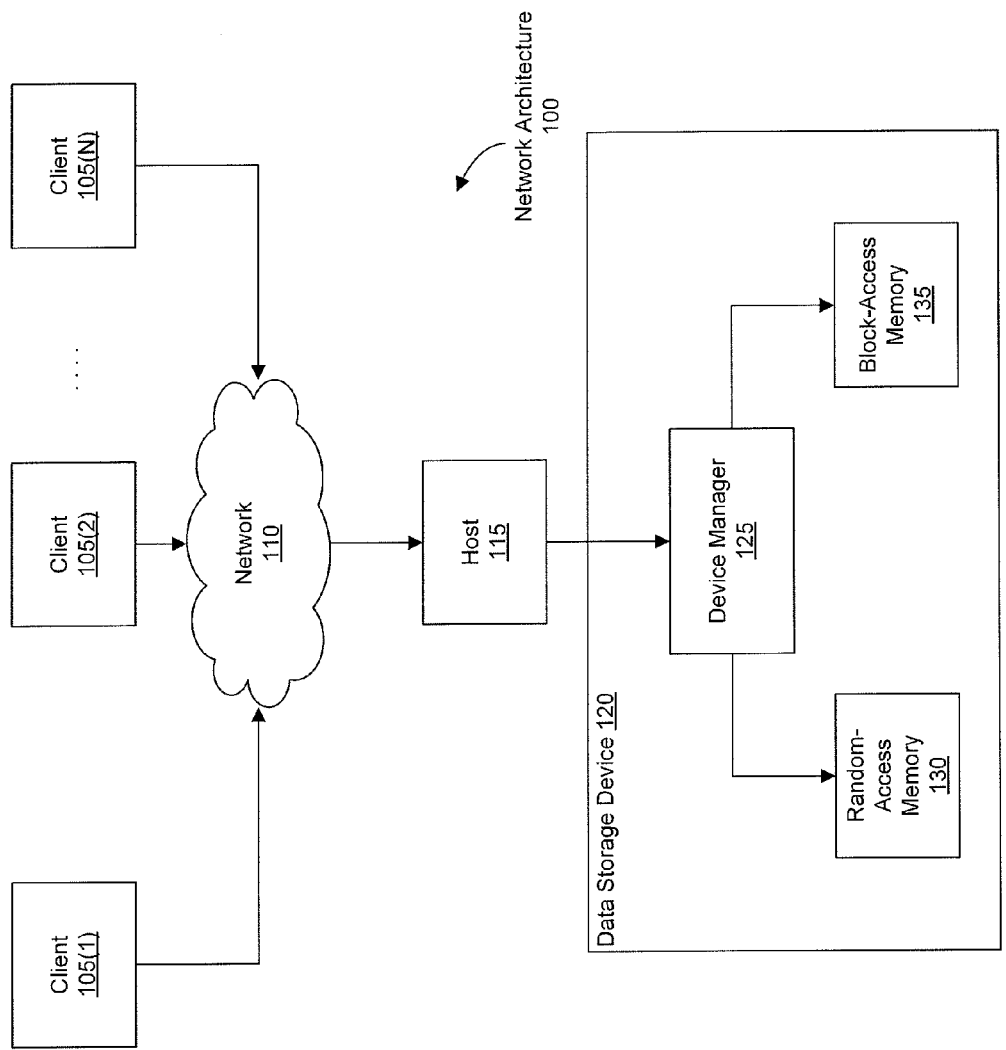
FIG. 1 is a simplified block diagram illustrating an embodiment of a network architecture in which one or more clients have network access to a server.

Embodiments of the present invention enable high-performance data storage systems using block-memory devices. According to an embodiment of the present invention, a storage device includes a block-access memory device configured to store data in one or more physical sector addresses and a random-access memory device storing a logical-to-physical (L2P) sector address translation data structure. Embodiments of the present invention include a device manager, coupled to both the block-access memory device and the random-access memory. The device manager determines a physical sector address in the block-access memory device, in response to a data access request. If the data access request is a data read request, the device manager maps a logical sector address associated with the data read request to a physical sector or a cache sector using the L2P sector address translation data structure. If the data access request is a data write request, the device manager records into the L2P sector address translation data structure, either a cache sector address or a physical sector address selected by the device manager.

Typically, block-access memory (e.g., NAND flash memory) devices store address translations in parts of the block-access memory itself. That is, during the operation of a typical block-access memory only part of the address translations are available for access in random-access memory. In order to reduce access latency of such block-access memory, address translations located in the block-access memory itself are not accessed unless absolutely necessary. Thus, in response to a data write request, only a limited set of logical sector to physical sector translations are available, limiting the physical sector locations to which a data write operation may be executed.

In marked contrast, embodiments of the present invention store the L2P sector address translation data structure in random-access memory, which enables any logical sector to be located at any physical sector address. Embodiments the present invention have increased flexibility regarding the selection of physical sector addresses to be used to store the data for write access, since all address translation data is accessible in random-access memory at once. By way of example and not of limitation, one embodiment can enable write data to be stored in a physical sector address that corresponds to an idle block-access memory, which allows the write request to proceed without waiting for a particular block-access memory to become idle and thus, available to accept the write request. Also by way of example and not of limitation, storing the L2P sector address translation data structure in random-access memory enables background processing engines to access all of the address translation data in order to facilitate determinations of which blocks of physical sectors within the block-access memory to erase.

Computer-readable storage media (e.g., hard disk drives, compact disc, read-only memory, random-access memory (RAM), cache memory, block-access memory, and the like) store data in physical sectors. Physical sectors are typically the smallest group of data stored in a computer-readable storage medium. Physical sectors are referenced by a physical sector address. Physical sector addresses can be electronically presented on address bus circuitry to enable data bus access to a physical sector.

Operating systems or applications executing on a host computer system typically reference data in terms of logical sectors. A logical sector is a smallest grouping of data that can be referenced by an operating system or application. A logical sector address is an address at which a logical sector appears to be located from the perspective of the operating system or application.

Since an operating system or application references data in terms of logical sector addresses, a logical sector address-to-physical sector address translation is performed in order to retrieve and write data. An operating system or application transmits a data access request to a computer-readable storage medium using a logical sector address. A device manager coupled to the computer-readable storage medium can translate the logical sector address to a physical sector address. The data access request (e.g., a data read request, a data write request, and the like) is then performed using the physical sectors corresponding to the physical sector address.

One embodiment of the present invention implements a memory hierarchy. Upper levels of the memory hierarchy have higher bandwidth, smaller size, and lower access latency than lower levels of the memory hierarchy. The memory hierarchy attempts to take advantage of "memory locality" in computer programs, such as operating systems or applications. In other words, the same memory locations or data stored therein are frequently accessed. Embodiments of the present invention take advantage of memory locality by storing and accessing frequently-accessed data at higher levels of the memory hierarchy (e.g., processor registers, cache memory, and the like) and storing less-frequently accessed data at lower levels of the memory hierarchy (e.g., random-access memory, disk storage, tertiary (backup) storage, and the like). Embodiments of the present invention do not require the use of all or some of the levels of the memory hierarchy.

For example, in order to rapidly service a data read request directed to a data storage device (which can include a cache memory and a block-access memory), a device manager of the data storage device will determine if the logical sector address associated with the data read request corresponds to a cache sector address (e.g., an address of a sector of data stored in a cache memory). If the logical sector address does correspond to a cache sector address, the data required to service the data read request resides in the cache memory of the data storage device. Since cache memory typically has lower latency, frequently-accessed data can be stored in the cache memory and subsequently evicted to the block-access memory when the data is less frequently accessed. If the logical sector address does not correspond to a cache sector address, then the device manager determines if the logical sector address corresponds to a physical sector address within the block-access memory, which has relatively higher access latency. By referencing the cache memory before referencing the block-access memory, frequently-accessed data (which is kept in the cache memory) will be quickly retrieved due to the lower access latency of the cache memory, with respect to the access latency of the block-access memory.

An Example Architecture For A High-Performance Storage Device

FIG. 1 is a simplified block diagram illustrating a network architecture usable with embodiments of the present invention. As depicted in FIG. 1, network architecture 100 provides clients 105(1)-105(N) coupled to a host 115 via a network 110. A client can be implemented using, for example, a desktop computer, a laptop computer, a workstation, a server, a cellular telephone, a smart telephone, a network-enabled personal digital assistant, and the like. Network 110, which can be used by clients 105(1)-105(N) to access host 115, can be implemented, for example, by a wide-area network such as the Internet, a metro-area network, or a local-area network (LAN). Network 110 can transport data using a variety of communication protocols, including, for example, Ethernet, IEEE 802.11x, SONET/SDH, TCP/IP, or some other communications protocol. As will be appreciated, host 115 can also be accessed by clients coupled directly thereto (not shown). The clients can even be implemented on the same machine as host 115 (also not shown). Alternatively, host 115 can be isolated from a network and remote clients.

As also depicted in FIG. 1, host 115 is coupled to a data storage device 120. Data storage device 120 further includes a device manager 125, configured to perform tasks such as receiving, managing and servicing data access requests directed to the data storage device. Device manager 125 is further coupled to random-access memory 130 and block-access memory 135.

While random-access memory 130 is shown as being implemented within data storage device 120, it will be appreciated that the random-access memory can be implemented anywhere in network 110. For example, according to another embodiment, random-access memory 130 can be directly coupled to host 115. Random-access memory 130 can be implemented by any type of volatile random-access storage, including, but not limited to, dynamic random-access memory (DRAM), synchronous dynamic random-access memory (SDRAM), and the like. According to one embodiment, random-access memory 130 can implement a battery back-up and/or a self-refresh mode to preserve the data in random-access memory 130, in the event of a system shutdown.

Block-access memory 135 can be implemented by any type of block-access storage device, including, but not limited to, flash memory such as, for example, NAND flash memory, managed flash memory, and the like. Block-access memory 135 can include a single block-access storage device or multiple block-access storage devices that can be accessed in parallel or in series with each other. A block-access storage device is a type of storage device in which data access requests are performed on specific pages of storage memory and each page can include several sectors of data. If a data access request is a data overwrite request, a target page in which the overwrite data is to be written is first erased, and then written with the new data. In some embodiments, erase operations erase a group of adjacent pages, called an erase block. If valid data is stored in some pages within an erase block targeted for erasure, the valid data is first written to other locations within the block-access memory before the erase operation is performed. In one embodiment, block-access memory 135 is implemented as a mass data storage device in a system for storing and servicing requests for large amounts of data such as, but not limited to, a database system, a web server, and the like.

Network architecture 100 is not limited to a single data storage device 120, but can implement more than one data storage device in order to increase the amount of available storage capacity, distribute data storage and access, load, or provide data redundancy such as, but not limited to, data mirroring, a redundant array of inexpensive disks (RAID) system, and the like. Network 110 can include other components such as routers, firewalls, and the like that are not germane to the discussion of the present invention and will not be discussed further herein.

One or more of clients 105(1)-105(N) can send data access requests (e.g., a write request or a read request) to host 115. Upon receipt of a data access request, host 115 provides a data access request targeted to data storage device 120. The data access request targeted at data storage device 120 includes at least one logical sector address. As described below in more detail, device manager 125 receives the data access request from host 115 and performs a logical-to-physical sector address translation either by accessing translation data stored in random-access memory 130 or by associating the logical sector address with a new physical sector address. Finally, device manager 125 performs the data access request on block-access memory 135 using the physical sector address and returns a result to host 115, which, in turn, returns the result to a client that originated the request. Host 115 can be configured to originate requests to the data storage device and to receive responses thereto (e.g., in an environment in which host 115 is isolated from a network and remote clients).

Figure 2:
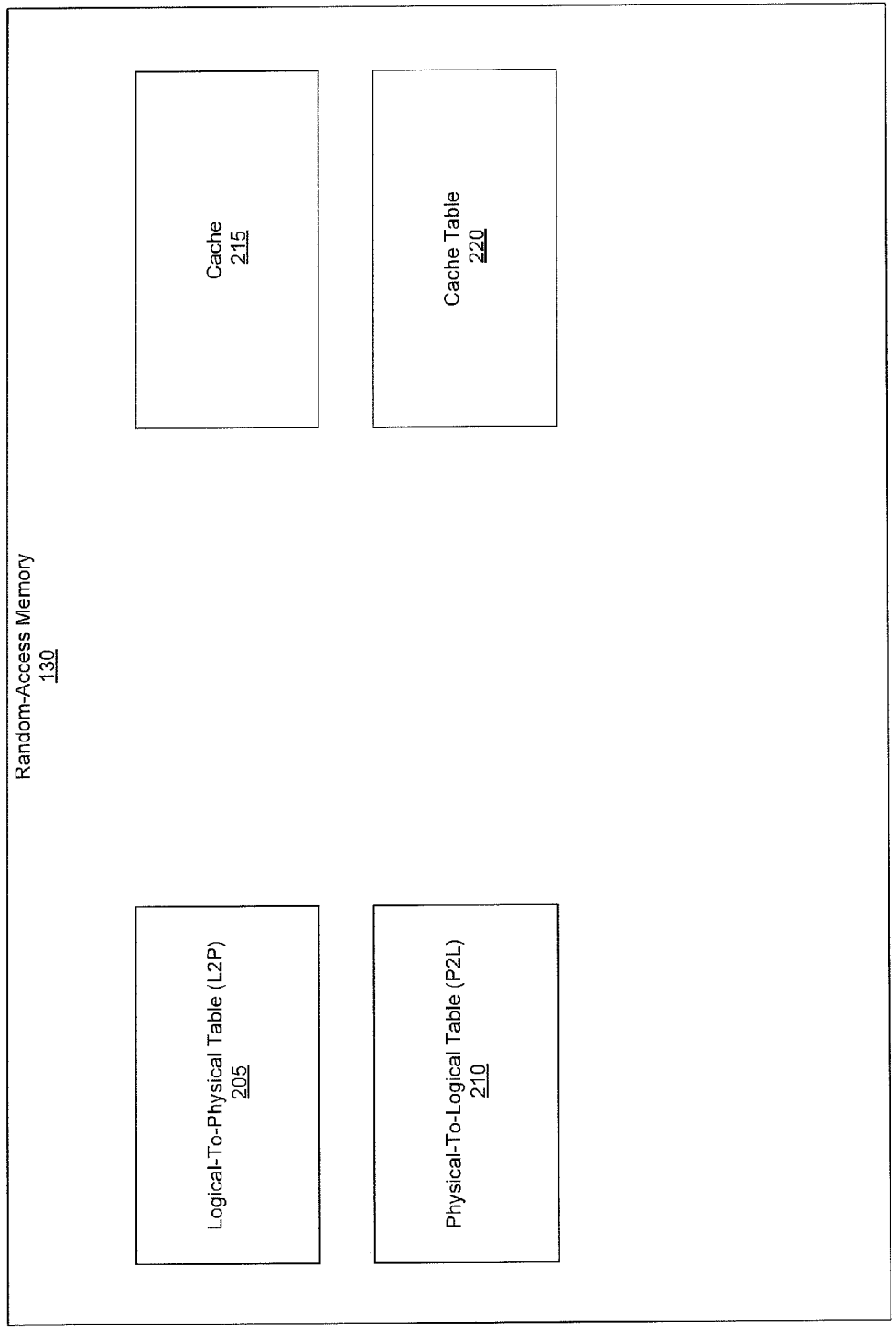
FIG. 2 is a more detailed block diagram depicting an embodiment of a random-access memory as shown in FIG. 1.

FIG. 2 is a simplified block diagram that depicts an example of a random-access memory. As illustrated, random-access memory 130 includes a logical-to-physical (L2P) table 205, physical-to-logical (P2L) table 210, cache 215, and cache table 220, all of which are discussed in more detail below. According to one embodiment, a flash translation layer (FTL) is implemented by L2P table 205 and P2L table 210. The flash translation layer provides logical-to-physical sector address translations in response to receiving data access requests targeted at data storage device 120 from host 115, wherein the data access requests include a logical sector address.

Figure 3A:
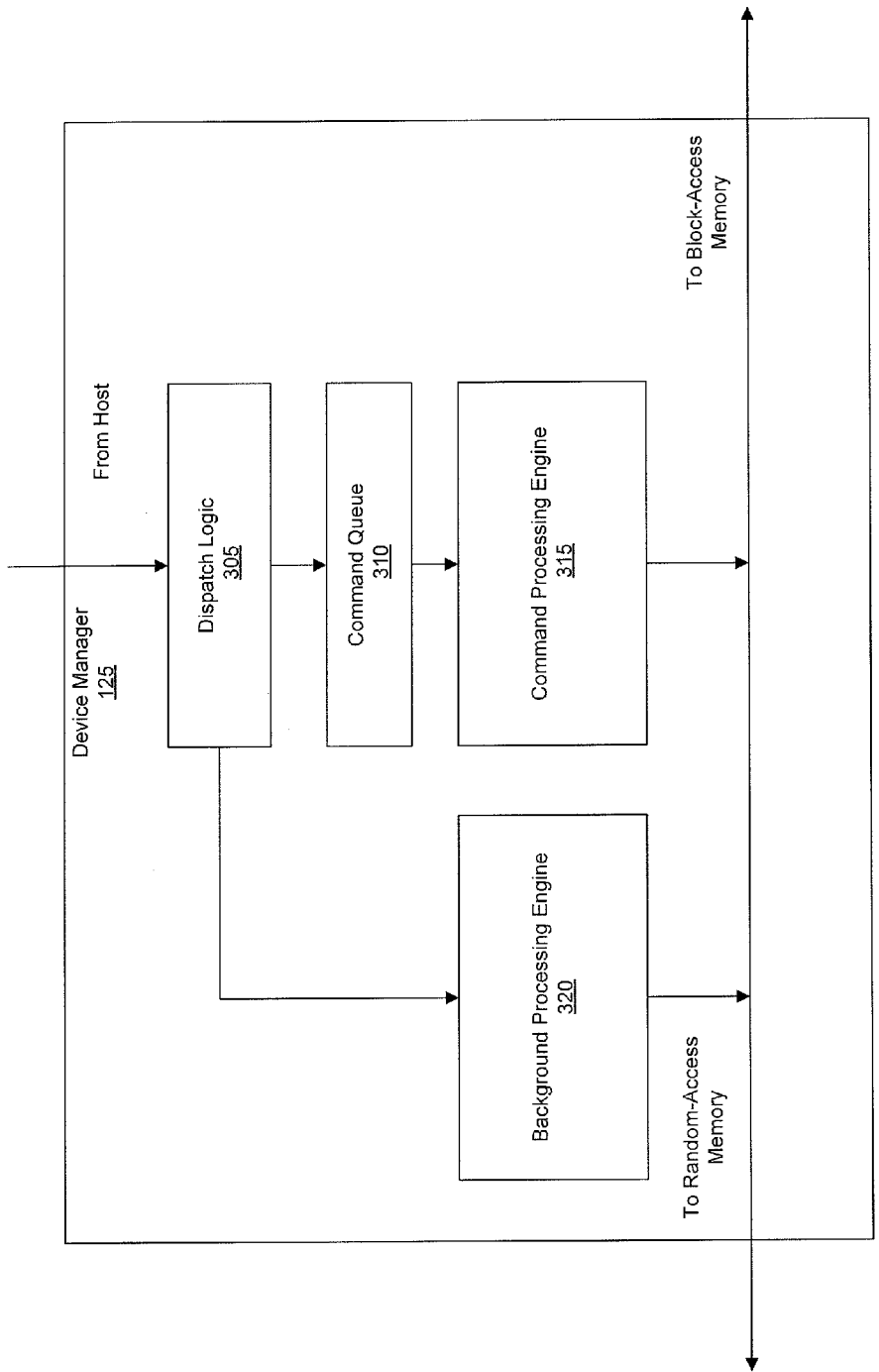
FIG. 3A is a more detailed block diagram illustrating an embodiment of a device manager as shown in FIG. 1.

FIG. 3A is a simplified block diagram that depicts an example of a device manager. As depicted, device manager 125 includes a dispatch logic 305, a command queue 310, a command processing engine 315, and a background processing engine 320, all of which are discussed below in greater detail. As previously discussed, device manager 125 can receive, manage, and service data access requests directed to the data storage device. Dispatch logic 305 can receive data access requests and place the data access requests into a command queue 310. A command queue is selected by the dispatch logic depending on the type of data access request. As processing capacity becomes available, dispatch logic 305 can forward the queued data access request from command queue 310 to a command processing engine 315. Command processing engine 315 can process various types of commands, such as, for example, data read, data write, and data erase commands. Command processing engine 315 can be implemented to process other types of commands not germane to the understanding of the present invention and will not be discussed further below. Command processing engine 315 can include one or more processing engines each configured to process one or more types of commands.

Dispatch logic 305 also controls background processing engine 320. Background processing engine 320 maintains at least a predetermined number of blank physical sectors within block-access memory 135 to enable rapid writing of data to the physical sectors. Background processing engine 320 also performs eviction of data from cache 215 to physical sectors within the block-access memory. Such data eviction is discussed herein in more detail in conjunction with FIG. 13. Background processing engine 320 can include one or more processing engines each configured to process one or more types of commands.

Figure 3B:
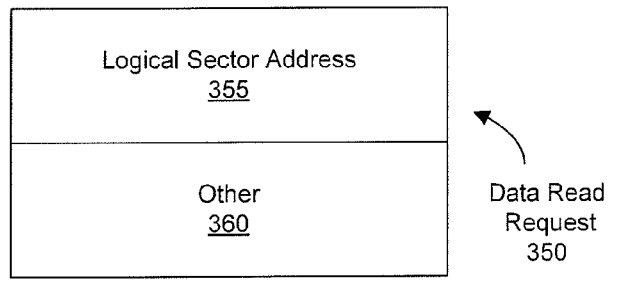
FIG. 3B is a simplified block diagram depicting an embodiment of a data read request, a data write request, and a data erase request, which are processed by the device manager as shown in FIGS. 1 and 3A.
Figure 3B:
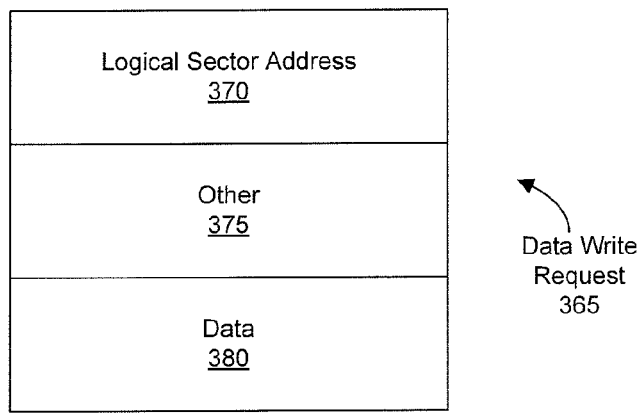
Figure 3B:
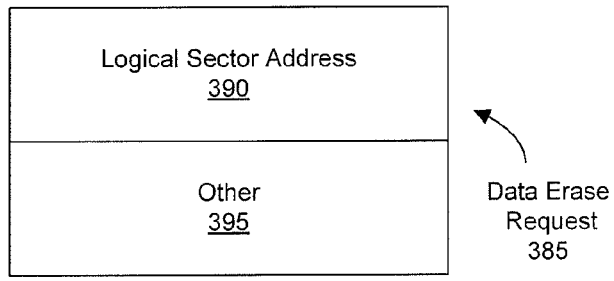

FIG. 3B is a simplified block diagram that illustrates examples of data access requests, which are capable of being processed by device manager 125, in accord with embodiments of the present invention. According to some embodiments, a "data access request" is a request to the data storage device to perform some action on at least one physical sector of the data storage device. A data access request from an operating system or application includes an associated logical sector address. By issuing the data access request, the operating system or application requests to perform some action at the logical sector corresponding to the logical sector address associated with the data access request.

Examples of a data access request include, but are not limited to, a data read request 350, a data write request 365, and a data erase request 385. Data read request 350 can include, for example, a logical sector address 355 and other information 360. Logical sector address 355 refers to a logical sector from which the operating system or application requests to retrieve data. As discussed above, logical sector address 355 corresponds to a physical sector accessible by data storage device 120, as addressed by a corresponding physical sector address. Data write request 365 can include, for example, logical sector address 370, other information 375, and data 380. Logical sector address 375 refers to a logical sector to which the operating system or application requests to write data. Data erase request 385 can include, for example, a logical sector address 390 and other information 395. Logical sector address 385 refers to a logical sector from which the operating system or application requests to erase data.

FIGS. 4-6 illustrate examples of a logical-to-physical (L2P) table, a physical-to-logical (P2L) table, and a cache table, respectively. While FIGS. 4-6 depict tables, embodiments of the present invention can implement such tables as any sort of data structure, including, but not limited to, arrays, records, arrays of records, data trees, and the like.

FIG. 4 illustrates an example of a logical-to-physical (L2P) table 205, usable by embodiments of the present invention. L2P table 205 stores logical-to-physical sector address translations to enable device manager 125 to retrieve a physical sector address corresponding to a logical sector address associated with a data access request. L2P table 205 can include various fields, including, for example, a logical sector address field 405, a status field 410, a physical sector address field 415, a cache sector address field 420, a semaphore field 425, and a usage field 430. L2P table 205 includes at least one entry, such as, for example, entry 435. Logical sector address field 405 can serve as an index for L2P table 205.

Status field 410 of L2P table 205 specifies the status of the logical sector addressed by the logical sector address in logical sector address field 405 for an entry. The values of status field 410 include, but are not limited to values representative of the following:

BLANK: The logical sector associated with the entry (e.g., entry 435) is blank and is not stored on the data storage device. The physical sector address field of the entry will not include any valid information. The cache sector address field of the entry will not include any valid information.

STORED: The logical sector associated with the entry is stored only in block-access memory 135. The physical sector address field of the entry specifies an address of the physical sector where the data is stored. The cache sector address field of the entry will not include any valid information.

READ-ONLY (RO): A read-only copy of the logical sector associated with the entry is stored in cache 215. A copy of this logical sector is also stored in the block-access memory, and both copies are identical. The physical sector address field specifies the address of the physical sector in the block-access memory where the data is stored. The cache sector address field of the entry specifies the address of the cache sector where the data is stored.

READ-WRITE (RW): A read-write copy of the logical sector associated with the entry is stored in cache 215. Any prior copy of the logical sector that was formerly stored in the block-access memory is obsolete, and can be recycled. The physical sector address field of the entry does not include any valid information. The cache sector address field of the entry specifies the address of the cache sector where the data is stored. At some point in the future, device manager 125 will write the data stored in the cache sector to a physical sector in the block-access memory.

Physical sector address field 415 specifies the physical sector in the block-access memory where the data for the logical sector is stored for an entry, as discussed above. Cache sector address field 420 points to a cache sector (if any) where the data for the logical sector is stored for an entry, as discussed above.

Semaphore field 425 allows multiple computing processes to coordinate their interaction with the logical sector of an entry. Values of semaphore field 425 include, for example, values representative of the following:

IDLE: The logical sector associated with the entry is not currently being accessed.

LOCKED: The logical sector associated with the entry is locked for exclusive use of one command processing engine or background processing engine and cannot be accessed by another command processing engine or background processing engine until the current command processing engine or background processing engine releases the logical sector. Semaphore field 425 can also include information identifying the particular command processing engine or background processing engine that locked the field of the entry.

Usage field 430 records usage history for the logical sector represented by the entry. The history can be used to optimize system performance. For example, usage field 430 can record how many times the logical sector represented by the entry has been accessed in a period of time or the time of last access. The history can then be used to determine, for example, the data that should be evicted from cache 215 to block-access memory 135.

FIG. 5 is an example of a physical-to-logical (P2L) table 210, usable by embodiments of the present invention. P2L table 210 stores physical-to-logical translations to enable device manager 125 to retrieve a logical sector address corresponding to a physical sector address associated with data stored on block-access memory 135. P2L table 210 can include various fields, including, for example, a physical sector address field 505, a status field 510, a logical sector address field 515, a semaphore field 525, and a usage field 530. P2L table 210 includes at least one entry, such as, for example, entry 535. Physical sector address field 505 can serve as an index for entries of P2L table 210.

Status field 510 specifies the status of the physical sector of the block access memory associated with the entry. Values of the status field include, for example, values representative for the following:

ERASED: The physical sector associated with the entry is available for writing. The logical sector address field of the entry will not include any valid information.

OBSOLETE: The physical sector associated with the entry includes data, but the data is obsolete because a newer copy of the corresponding logical sector data has been written to the cache, or another physical sector in the block-access memory. The logical sector address field will not include any valid data. The physical sector associated with the entry can be erased at any time, if needed.

VALID: The physical sector associated with the entry is stored in the block-access memory. A read-only copy of data stored in the physical sector associated with the entry can also be stored in the cache. If a read-only copy of the data stored in the physical sector is also stored in the cache, both copies of the data are identical.

BAD: The physical sector associated with the entry is bad and should not accept data writes.

Logical sector address field 515 specifies the logical sector of the data that is stored in the physical sector. Semaphore field 525 allows multiple computing processes to coordinate their interaction with the physical sector. Values of semaphore field 525 include, for example, values representative of the following:

IDLE: The physical sector associated with the entry is not currently being accessed.

LOCKED: The physical sector associated with the entry is locked for exclusive use of one command processing engine or background processing engine and cannot be accessed by another command processing engine or background processing engine until the current command processing engine or background processing engine releases the physical sector. Semaphore field 525 can include information identifying the particular command processing engine or background processing engine that locked the field of the entry.

Usage field 530 records usage history for the physical sector associated with the entry. The history can be used to optimize system performance.

FIG. 6 is an example of a cache table 220, usable by embodiments of the present invention. Cache table 220 stores cache sector address-to-logical sector address translations to enable device manager 125 to retrieve a logical sector address corresponding to a cache sector. Cache table 220 can include various fields, including, for example, a cache sector address field 605, a status field 610, a logical sector address field 615, a semaphore field 620, and a usage field 625. Cache table 200 includes at least one entry, such as, for example, entry 630. Cache sector address field 605 can serve as an index for entries of cache table 220.

Status field 610 specifies the status of the cache sector associated with the entry in the cache table. Possible values of the status field include, but are not limited to, values representative of the following:

BLANK: The cache sector associated with the entry is empty and is available for use.

READ-ONLY (RO): The cache sector associated with the entry contains only read-only cached data, which is identical to the data stored in the block-access memory that corresponds to the same logical sector address. The logical sector address field specifies the logical sector address for the data that is stored in the cache sector represented by the entry. The data stored in the cache sector can be discarded, and this cache sector associated with the entry can be recycled at any time, if needed.

READ-WRITE (RW): The cache sector associated with the entry contains read-write data, which has not yet been stored in the block-access memory. The logical sector address field specifies the logical sector address of the data stored in the cache sector represented by the entry. The data stored in the cache sector associated with the entry should be written to the block-access memory before the cache sector can be recycled. When the data stored in the associated cache sector is written to the block-access memory, the status field of the entry will change from RW to RO. If the data stored in the associated cache sector is evicted from the cache, the status field of the entry will change from RW to BLANK.

Logical sector address field 615 specifies the logical sector address of the data that is stored in the cache sector associated with the entry. Semaphore field 620 allows multiple computing processes to coordinate their interaction with the cache sector associated with the entry. Values for semaphore field 620 include, for example, values representative of the following:

IDLE: The cache sector associated with the entry is not currently being accessed.

LOCKED: The cache sector associated with the entry is locked for the exclusive use of one command processing engine or background processing engine and cannot be accessed by another command processing engine or background processing engine until the command processing engine or background processing engine releases the cache sector. Semaphore field 620 can also include information identifying command processing engine or background processing engine that has locked the cache sector of the entry.

Usage field 625 records usage history for the cache sector associated with the entry. The history can be used to optimize system performance.

L2P table 205 and P2L table 210 need not have the same number of entries. Write access latency decreases when there are more physical sectors in use than logical sectors. As previously discussed, data stored in a physical sector of block-access memory 135 cannot be directly overwritten. To overwrite data stored at a particular physical sector, the physical sector must first be erased and then subsequently written with new data. However, since single physical sectors (or even single pages) cannot be erased, groups of adjacent pages, referred to as an "erase block" must be erased at one time. Thus, any valid data stored within an erased block designated for erasure must first be moved out of the erase block before the erase operations can begin. Thus, overwrite operations have a lengthy access latency, as compared to other data access operations. In order to reduce the access latency for an overwrite operation, an overwrite operation is treated as a write operation to a blank physical sector. The physical sector that stored the prior copy of the data is marked as obsolete. A background task performed by, for example, background processing engine 320 can perform erase operations on physical sectors marked as obsolete physical sectors. Performing access latency reduction for an overwrite operation is facilitated by using more physical sectors than logical sectors since some physical sectors corresponding to the logical sectors will hold valid data, while other physical sectors are marked as obsolete for erasure by a background task when system resources become available.

According to one embodiment, at least portions of L2P table 205 and P2L table 210 are written to block-access memory 135 when data storage device 120 is shut down or powered off. Those portions of L2P table 205 and P2L table 210 are read back from block-access memory 135 when the data storage device is powered up.

In an embodiment of the present invention in which block-access memory 135 is implemented with multiple flash memories, the physical sector addresses of the flash memories are organized so that the physical sectors that are adjacent in P2L table 210 are spread across different flash memories. For example, and not of limitation, the addressing for physical sectors are set up so that eight consecutive physical sectors are in the same flash memory, then the next eight consecutive physical sectors are in a different flash memory. Such an arrangement will help ensure that physical sector writes to neighboring physical sectors are spread across multiple flash memories.

Figure 7:
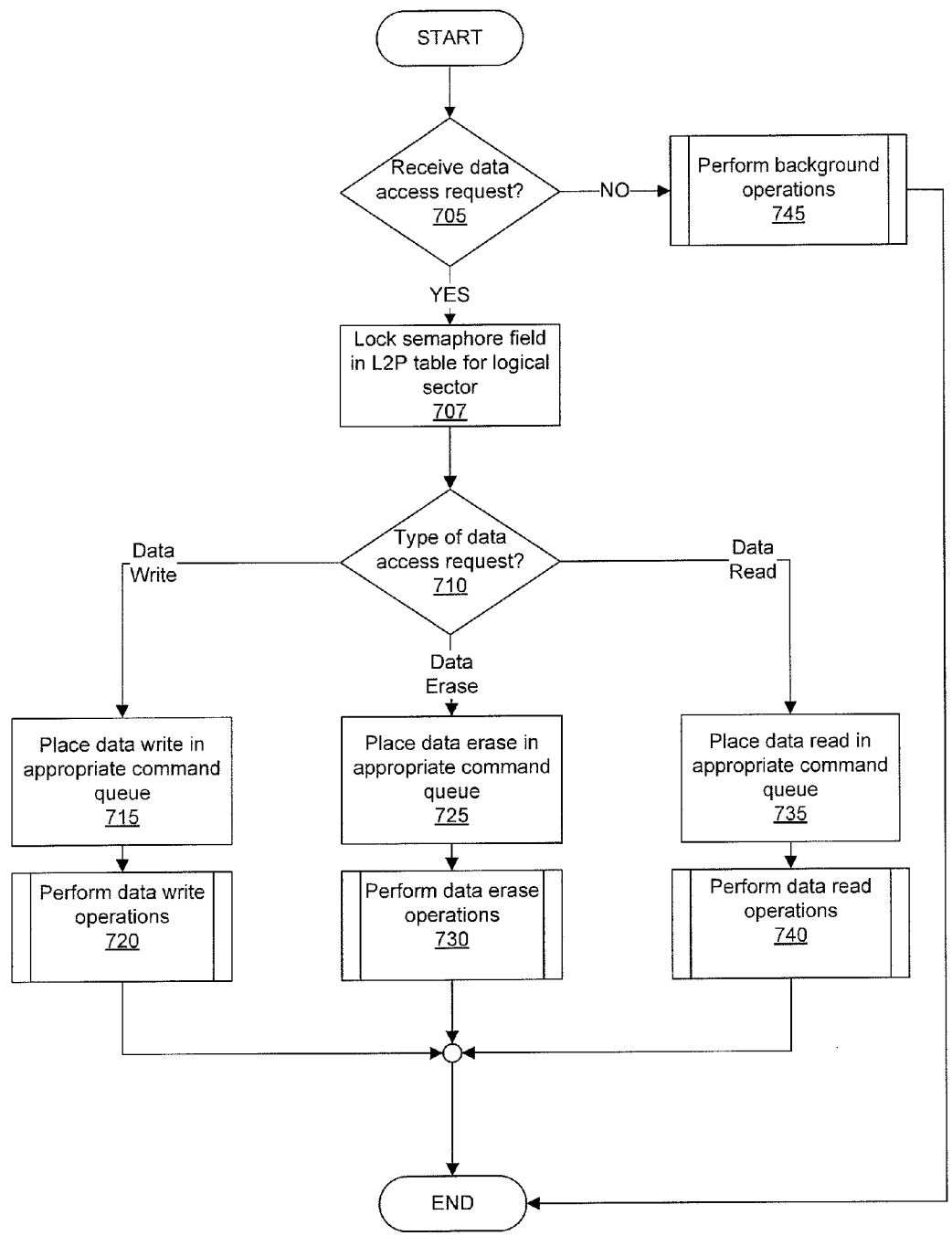
FIG. 7 is a simplified flow diagram illustrating an embodiment of general processing operations performed by the device manager.

FIG. 7 is a simplified flow diagram depicting an example of general processing operations performed by a device manager of a data storage device, in accordance with embodiments of the present invention. A determination is made as to whether a data access request has been received (e.g., from a host 115) (705). The device manager locks a semaphore field 425 of an entry of logical-to-physical (L2P) table 205 corresponding to the logical sector address associated with the data access request (707). As previously discussed, the semaphore field enables multiple command processing engines or background processing engines to coordinate their interaction with a particular storage memory location represented by the logical sector address. The semaphore field can indicate that the storage memory location is currently not being accessed by a command processing engine or background processing engine or is locked for exclusive use of one command processing engine or background processing engine and cannot be accessed by another command processing engine or background processing engine until the current command processing engine or background processing engine releases the lock. The semaphore field can also include information identifying the command processing engine or background processing engine that has locked the semaphore field.

A determination is made as to whether the data access request is a data write request, a data read request, or a data erase request (710). Such a determination can be made by dispatch logic 305 of a device manager. If the data access request is a data write request, the data write request is placed in an appropriate command queue 310 by, for example, dispatch logic 305 (715). When the data write request exits the command queue, the data write request is forwarded to an appropriate command processing engine 315. The command processing engine performs the data write operations dictated by the data write request (720). The data write operation will be discussed herein in more detail in conjunction with FIGS. 10 and 11.

If the data access request is a data erase request, the data erase request is placed in an appropriate command queue 310 by, for example, dispatch logic 305 (725). When the data erase request exits the command queue, the data erase request is forwarded to an appropriate command processing engine 315. The command processing engine performs the data erase operations dictated by the data erase request (730). The data erase operation will be discussed below in more detail in conjunction with FIG. 9.

If the data access request is a data read request, the data read request is placed in an appropriate command queue 310 by, for example, dispatch logic 305 (735). When the data read request exits the command queue, the data read request is forwarded to an appropriate command processing engine 315. The command processing engine performs the data read operations dictated by the data read request (740). The data read operation will be discussed below in more detail in conjunction with FIG. 8.

If a data access request has not been received from the host (705), the dispatch manager can send a command to background processing engine 320 to perform background operations (745). The background operations will be discussed below in more detail in conjunction with FIGS. 12-14.

Figure 8:
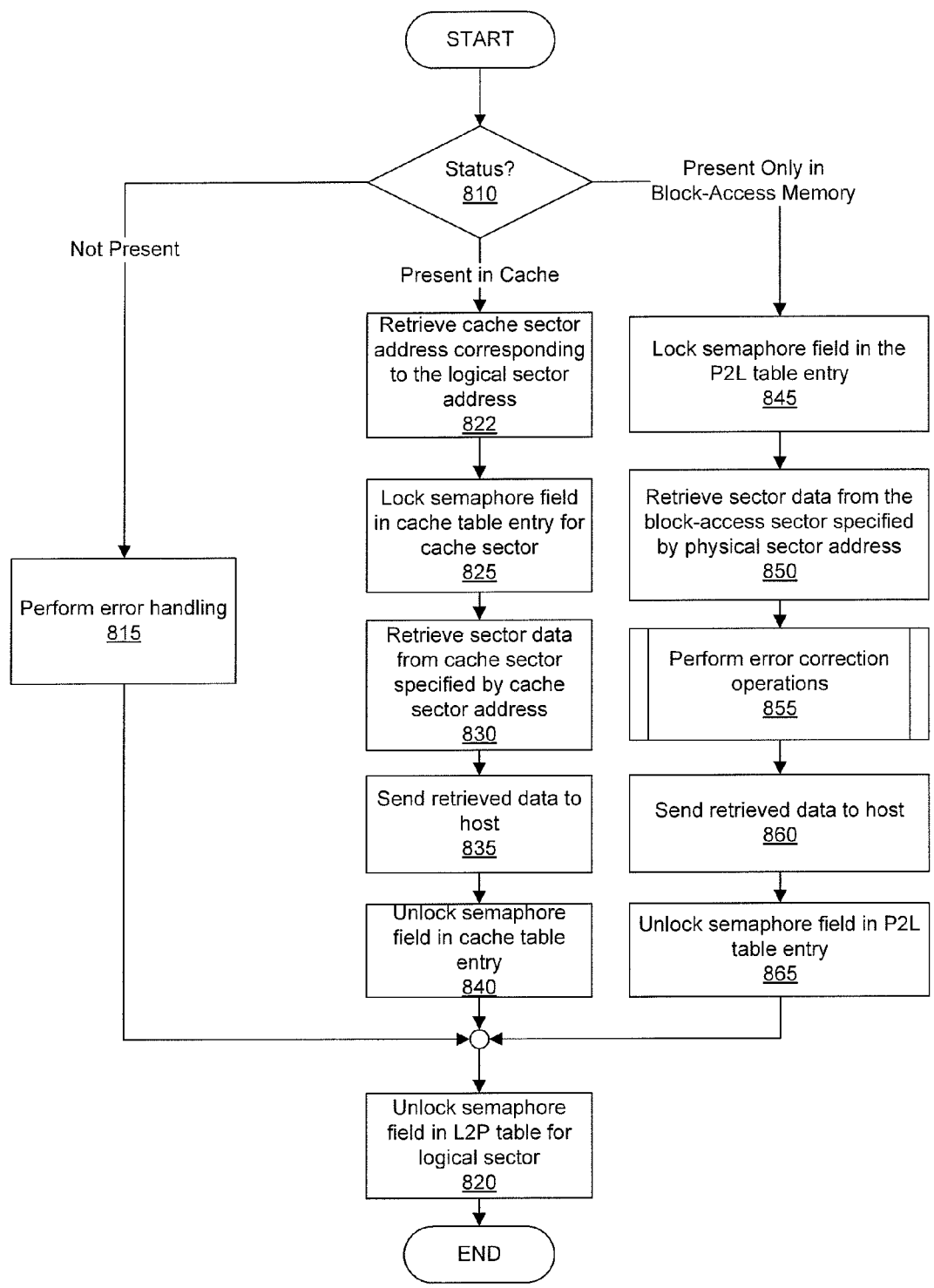
FIG. 8 is a simplified flow diagram depicting an embodiment of a data read request operation performed by the device manager.

FIG. 8 is a simplified flow diagram illustrating a data read request operation 740 in accordance with embodiments of the present invention. The data read request operation enables a host to request and retrieve data from a specific logical sector addressed by a logical sector address 355 associated with a data read request 350.

The command processing engine refers to a status field 410 of the entry of the L2P table corresponding to logical sector address 355 to determine the status of an associated physical sector address or cache sector address (810). If the value of the status field indicates that there is no physical sector address or cache sector address corresponding to the logical sector address, the command processing engine can perform error handling for the data read request (815). If no physical sector address or cache sector address corresponds to the logical sector address, then the requested data is not stored in a physical sector on the data storage device or in a cache sector of cache 215. The command processing engine then unlocks the semaphore field in the entry of the L2P table corresponding to the logical sector address (820).

If the value of the status field of the entry of the L2P table corresponding to logical sector address 355 indicates that the physical sector corresponding to the logical sector address is present in cache 215, the command processing engine retrieves a cache sector address 420 corresponding to the logical sector address of the data read request (822). The command processing engine locks a semaphore field 620 of an entry within a cache table 220 for the retrieved cache sector address (825). The command processing engine can retrieve data from the cache sector associated with the cache sector address (830). The command processing engine sends the retrieved data to the host (835). Then, the semaphore field in the cache table entry is unlocked (840).

If the value of the status field of the entry of the L2P table corresponding to logical sector address 355 indicates that the physical sector corresponding to the logical sector address is present only in a block-access memory 135, the command processing engine locks a semaphore field 425 in an entry P2L table 210 (845) and retrieves the data from the associated physical sector address for that entry (850). Error correction can be applied to the data, if necessary (855) and the retrieved data is returned to the host (860). Then, the semaphore field in the P2L table is unlocked (865). In one embodiment, the sector read from block-access memory will also be stored in a cache sector with an associated cache table entry that includes a status field with a value that indicates that the cache sector is empty and available for storage (e.g., BLANK) and the status field for that cache table entry is set with a value representative of READ-ONLY, in order to reduce access latency of any repeated read access to that same cache sector.

As discussed in conjunction with operation 865, upon reading data from a physical sector, a data error can be detected and corrected by error correcting code (ECC) that is read back from the physical sector at the same time. In other embodiments, errors can be detected and corrected when data is written to a physical sector if the system is configured to read back the data after the data is written and the data read back does not match the data that was written.

In order to optimize performance in some embodiments, the command processing engine can read physical sectors and store the data retrieved from the physical sectors without being prompted by the host computer (e.g., "data prefetching"). Data can be prefetched, for example, when:

A physical page from the block-access memory is read, in response to the host requesting a logical sector that was contained in the physical page, all other physical sectors that were stored in the same physical page can be stored in the cache; and The host computer requests a logical page, a preset number of contiguous logical pages can be read, in anticipation of the host asking for these logical pages in the near future.

Embodiments of the present invention can implement an enhancement to the operating system, file system, or device drivers to notify the device manager when logical sector addresses were invalidated. The invalidation notification could then be used by the device manager to deallocate or erase data sectors from the data storage device and minimize the number of sectors that require move operations when erasing storage blocks within the data storage device.

Figure 9:
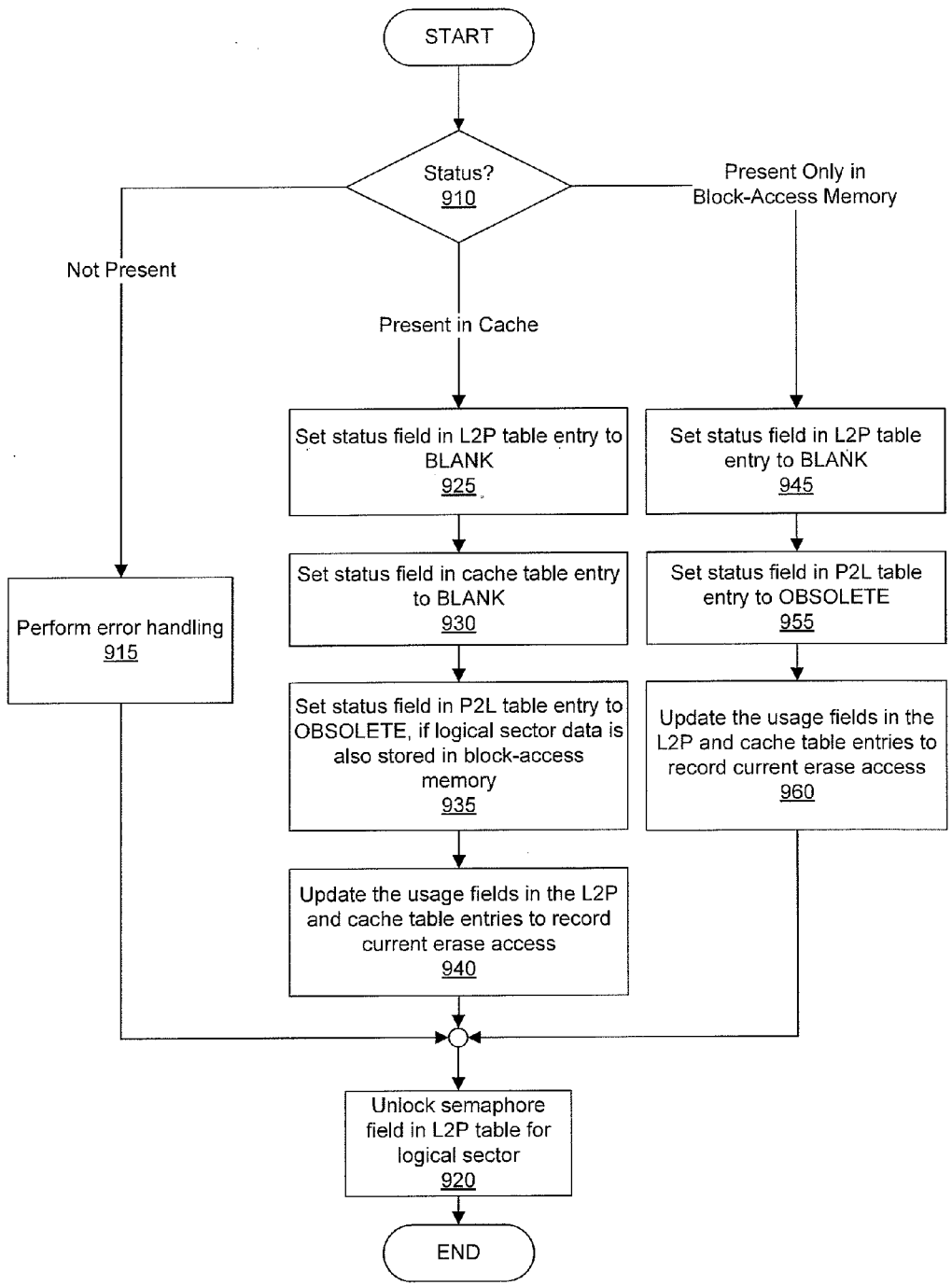
FIG. 9 is a simplified flow diagram illustrating an embodiment of a logical sector erase operation performed by the device manager.

FIG. 9 is a simplified flow diagram depicting an example of a logical sector erase operation (e.g., data erase operations 730 of FIG. 7) performed by the device manager. If the value of the logical sector's status field in the L2P table entry associated with the logical sector is a BLANK value (that is, if the logical sector does not exist) (910), a command processing engine can perform error handling since no erasure is needed (915). Then, the semaphore field in the L2P table entry for the logical sector is unlocked (e.g., by the command processing engine) (920).

If the value of the logical sector's status field in the L2P table entry associated with the logical sector indicates that the logical sector is present in the cache (e.g., Read-Only or Read-Write), a command processing engine can set the status field in the L2P table entry and the cache table entry to a BLANK value (925), indicating that the logical sector is to be erased (930). The command processing engine will also set the value of a status field in the associated P2L table entry to OBSOLETE, if logical sector data is also stored in a physical sector in the block-access memory (935). Then, the command processing engine updates the usage fields in the L2P and cache table entries corresponding to the logical sector to record the current erase access (940). Finally, the command processing engine unlocks the semaphore field in the L2P table entry for the logical sector.

If, the command processing engine determines that the logical sector is only present in the block-access memory (e.g., a value of the status field in the L2P table entry associated with the logical sector is a STORED value), the command processing engine can set the status field in the L2P table to a BLANK value (945), which indicates that the logical sector has been erased. The command processing engine can set the status field in the associated P2L table entry to an OBSOLETE value, indicating that the data stored in the physical sector corresponding to the logical sector is out-of-date (955). The command processing engine can update the usage fields in the L2P and cache table entries to record current erase access (960).

Figure 10:
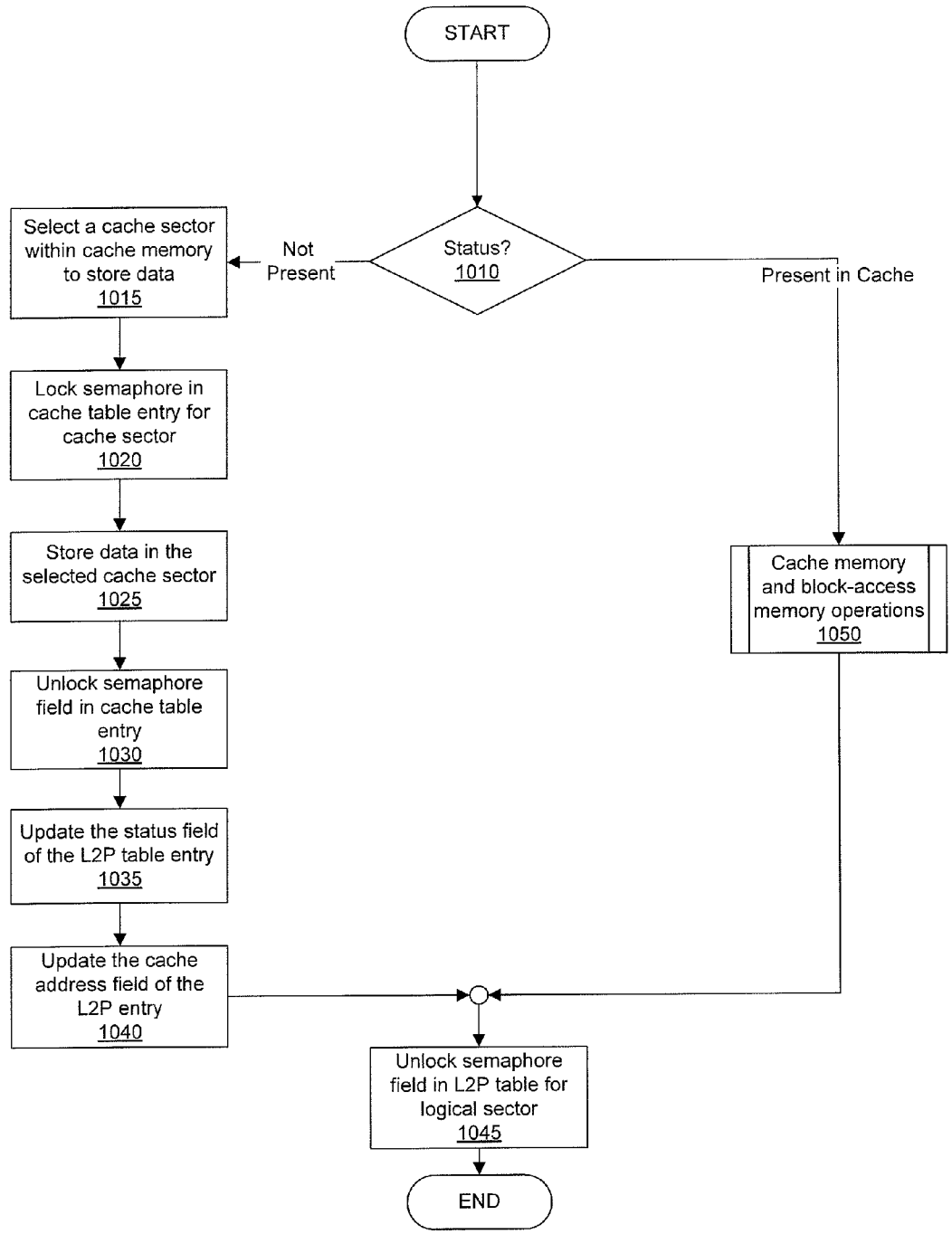
FIGS. 10-11 are simplified flow diagrams illustrating an embodiment of a data write request operation performed by the device manager.
Figure 11:
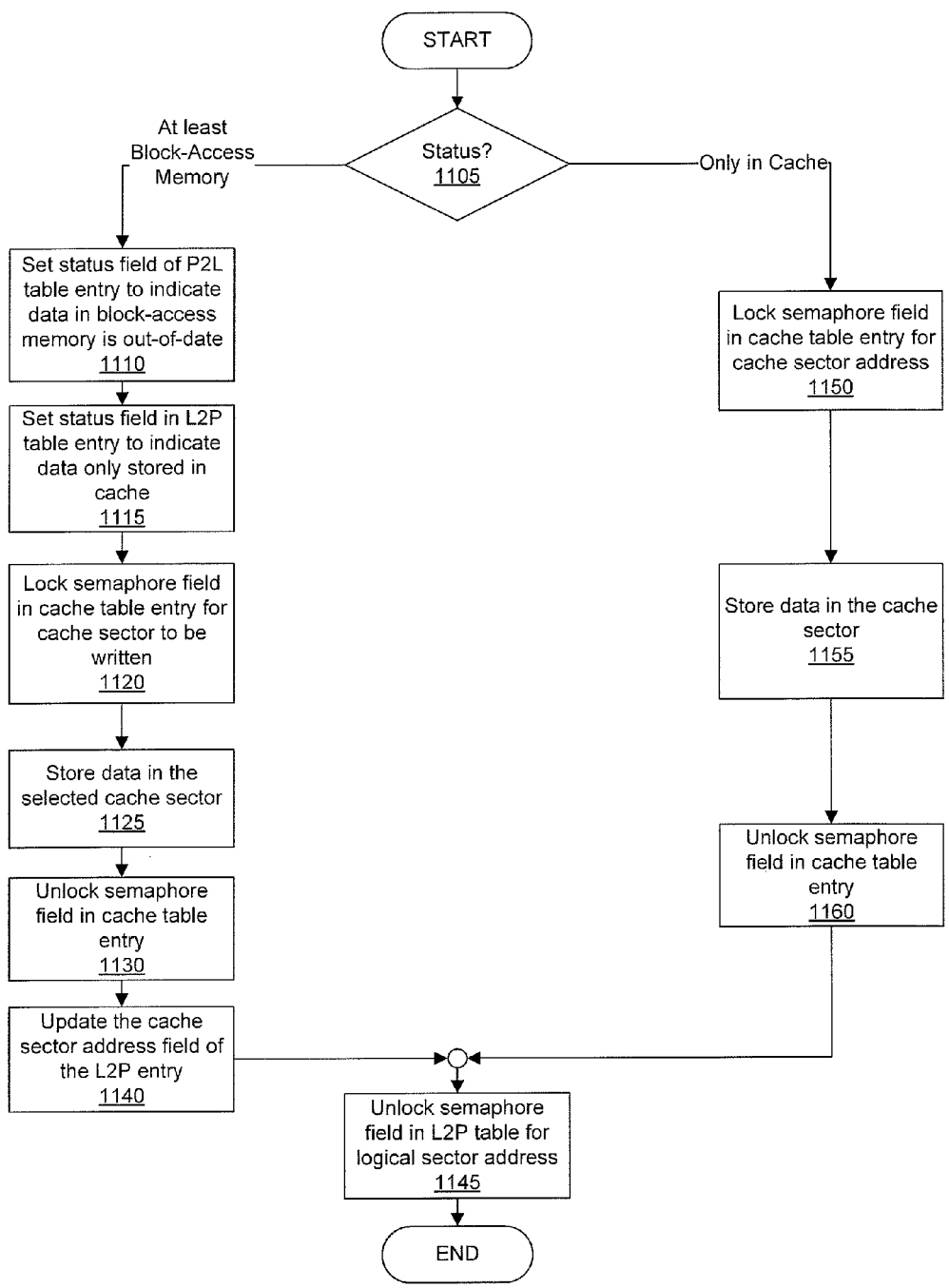

FIGS. 10 and 11 are simplified flow diagrams depicting a data write operation (e.g., data write operations 720 of FIG. 7) performed by embodiments of the present invention. The data write request operation enables the host to write data to a logical sector associated with a logical sector address 370 of a data write request 365. A command processing engine can refer to a status field of an entry of the L2P table corresponding to the logical sector address to determine the status of a physical sector address corresponding to the logical sector address (1010). If the value of the status field associated with the entry indicates that there is no valid or current physical sector address corresponding to the logical sector address, a command processing engine can select a cache sector, using an associated cache sector address, within cache 215 for storing data associated with the data write request (1015). The command processing engine locks a semaphore field in a cache table entry associated with the selected cache sector (1020). The command processing engine can then store the data associated with the data write request in the selected cache sector (1025). The command processing engine then unlocks the semaphore field in the cache table entry (1030). Then, the status field of the L2P table entry is updated making the associated cache sector available for access by other processing engines to indicate that the data associated with the data write request is only stored in the cache (e.g., setting a status field to a value representative of READ-WRITE) (1035). The cache sector address field of the L2P table entry associated with the logical sector address of the data write request is also updated with current information (1040). Finally, the semaphore field in the L2P table for the logical sector address is unlocked (1045). On the other hand, if the status field of the L2P table entry indicates that a prior copy of data corresponding to the data write request is present in the cache or block-access memory, the command processing engine performs cache memory and block-access memory operations (1050). The cache memory and block-access memory operations are discussed in more detail below in conjunction with FIG. 11.

FIG. 11 is a simplified flow diagram depicting cache memory and block-access memory operations performed by embodiments of the present invention. The value of the status field associated with the entry corresponding to the logical sector address is examined to determine whether a prior copy of the data associated with the data write request is resident in at least the block-access memory (1105). If so, then a command processing engine can set the status field of the related P2L table entry corresponding to the physical sector address of the prior copy of data to a value indicating that the data in the block-access memory is out-of-date (e.g., setting a value of the P2L status field to OBSOLETE) (1110). As previously discussed, limitations of block-access memory do not allow an in-place update of a physical sector of the block-access memory. Thus, the data associated with the data write request is written to the cache memory and the prior copy of the data resident in the block-access memory is invalidated. In this manner, subsequent accesses to the associated logical sector address will be served by referencing the cache memory, until the cache data is ultimately stored in a new physical sector of the block-access memory.

The command processing engine then can set the status field in the L2P table entry associated with the logical sector address corresponding to the data write request to a value indicating that the data corresponding to the data write request is only stored in the cache (e.g., a status field value representative of READ-WRITE) (1115). The semaphore field in the cache table entry for the cache sector to be written is locked (e.g., by the command processing engine) (1120). The command processing engine can then store the data corresponding to the data write request in the selected cache sector (1125). Once the data is stored, command processing engine unlocks the semaphore field in the cache table entry associated with the cache sector (1130). The cache sector address field of the L2P entry corresponding to the logical sector address associated with the data write request is also updated (1140). Finally, the command processing engine unlocks the semaphore field in the L2P table entry for the logical sector address associated with the data write request (1145).

If the value of the status field of the L2P table entry of the logical sector address corresponding to the data write request indicates that a prior copy of the data associated with the data write request is stored only in the cache (e.g., at a cache sector associated with a cache sector address), a command processing engine can lock the semaphore field in the cache table entry for the cache sector address (1150). The command processing engine stores the data associated with the data write request to the cache sector associated with the cache sector address (1155). Then, the semaphore field in the cache table entry is unlocked (1160).

Figure 12:
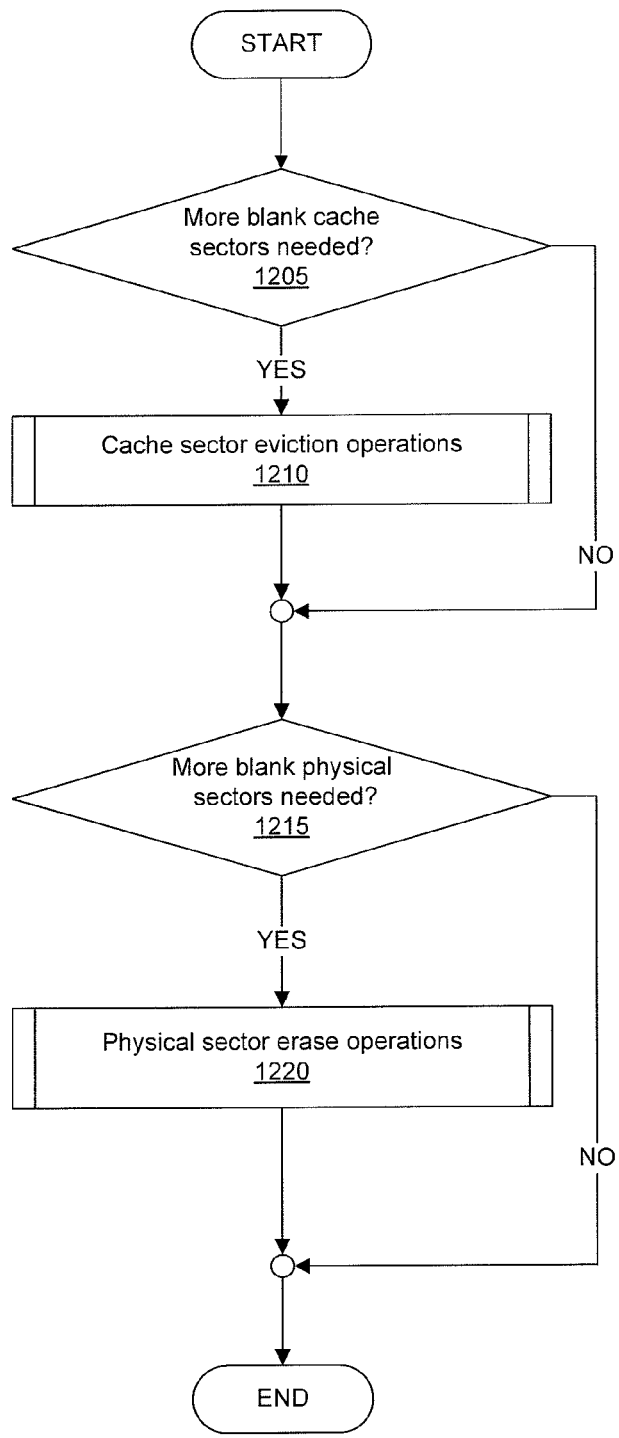
FIG. 12 is a simplified flow diagram depicting an embodiment of background processing operations performed by the device manager.

FIG. 12 is a simplified flow diagram illustrating background processing (e.g., background operations 745) performed by embodiments of the present invention. According to one embodiment of the present invention, a device manager can perform background processing when the device manager is not processing data access requests. The device manager can perform background processing to determine if a number of available cache sectors falls below a first predetermined threshold (1205). If the number of available cache sectors falls below the first predetermined threshold, cache sector eviction operations are performed (1210). The device manager can also perform background processing to determine if a number of available physical sectors in the block-access memory device falls below a second predetermined threshold (1215). If the number of available physical sectors falls below the second predetermined threshold, physical sector erase operations are performed (1220). Cache sector eviction operations are discussed in more detail below in conjunction with FIG. 13. Physical sector erase operations are discussed in more detail below in conjunction with FIG. 14.

Some block-access memory devices usable with embodiments of the present invention do not allow erasure of a single physical sector. Instead, a complete erase block must be erased. Block-access erase blocks include a group of adjacent write pages, which include a group of physical sectors.

Determining which erase blocks to erase depends on a variety of factors including, but not limited to:

- The availability of system resources available for performing background tasks such as erasing erase blocks;
- The number of OBSOLETE physical sectors in proportion to the number of VALID physical sectors (since moving valid data can be more resource-intensive than merely erasing an OBSOLETE physical sector);
- If data needs to be moved from a VALID physical sector, whether the data must be moved from one block-access memory to another, in systems that implement multiple block-access memories (moving data from one physical sector to another on the same block-access memory is less resource and time-intensive than moving data from one block-access memory to another); and
- Whether a number of BLANK physical sectors falls below a predetermined threshold.

Figure 13:
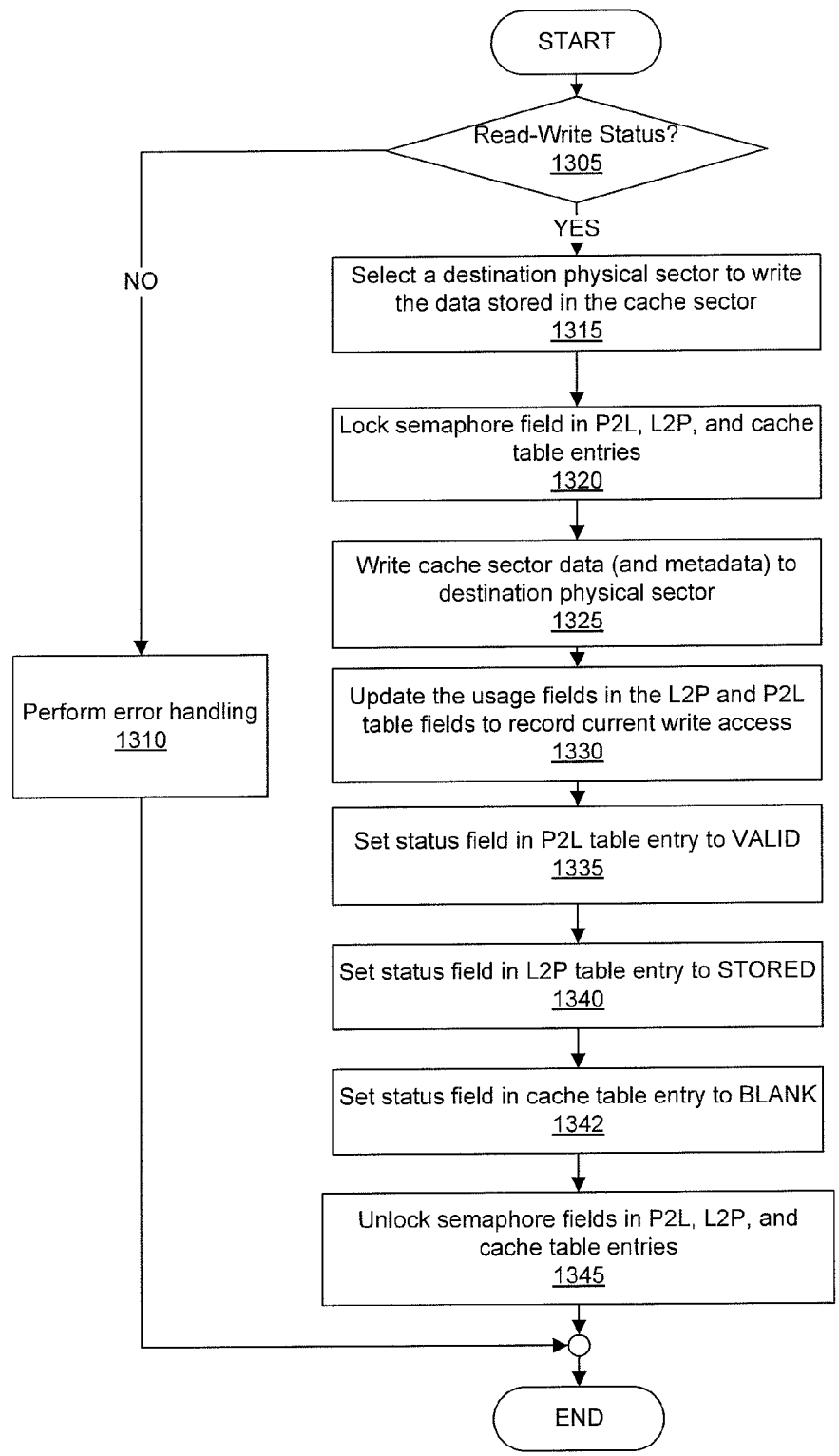
FIG. 13 is a simplified flow diagram illustrating an embodiment of a cache sector erase operation performed by the device manager.

FIG. 13 is a simplified flow diagram illustrating an example of a cache sector data eviction operation 1210 performed by embodiments of the present invention. An eviction operation occurs when data in a cache sector is selected for removal from the cache, stored in a selected physical sector of a block-access storage device, and the status field of the cache table entry associated with cache sector is marked with a value representative of BLANK. A background processing engine can determine if a value of the status field of the cache table entry corresponding to the cache sector to be evicted is READ-WRITE (referred to below as a "RW cache sector"), indicating that data stored in the cache sector is only stored in the cache (1305). If the value of the status field of the cache table entry corresponding to the cache sector to be evicted is not READ-WRITE, error handling is performed (1310) and the process ends. If the value of the status field of the cache table entry corresponding to the cache sector to be is READ-WRITE, the background processing engine can select a destination physical sector of the block-access storage device to write the data stored in the cache sector (1315). The background processing engine can then lock the semaphore fields of the P2L, L2P, and cache table entries to prevent other processes from modifying the entries while the cache sector data is written to a destination physical sector (1320). The background processing engine can cause the cache sector data (and metadata, if appropriate) to be written to the selected destination physical sector (1325). The background processing engines can update the values of the usage fields in the L2P and P2L table entry fields to record current write access (1330). The background processing engine then sets the value of the status field in the P2L table entry to VALID (1335), indicating that the data stored in the destination physical sector is VALID. The background processing engine sets the value of the status field in the L2P table entry to STORED (1340), indicating the storage location of the data (e.g., a physical sector of the block-access memory). The background processing engine sets the value of the status field in the cache table entry to BLANK (1342). The background processing engine then unlocks the semaphore fields in P2L, L2P, and cache table entries (1345), after which, the operation ends.

In one embodiment of the present invention, deciding which RW sectors to evict (1305) to generate more BLANK cache sectors is performed by inspecting usage statistics stored in usage fields 625 of entries within a cache table 220. The usage field in the cache table will be used to pick a cache sector that seems least likely to be written or read by the host in the near future. Embodiments of the present invention can make such a determination using, for example, a least-recently used (LRU) algorithm or frequency of access algorithm. In another embodiment, the sector data would be left in the cache, but the status field of the cache table entry associated with the sector will be marked with a value representative of READ-ONLY, which would keep the data available in case the data is read in a subsequent data read request, but the data is ready to be discarded at short notice if cache sectors are required.

Embodiments of the present invention can select, if possible, a group of RW cache sectors in order to make a full page of data to write. The group of RW cache sectors will be written to block-access memory as a single page write. When writing the group of RW cache sectors to the block-access memory, a background processing engine can locate other cache sectors that have logical sector addresses that neighbor those associated with the cache sectors being evicted to the block-access memory. If cache sectors with sequential or nearly sequential logical sector addresses are written to the block-access memory at once, later read performance can be improved when the data is read back into the cache (e.g., prefetched).

According to another embodiment, the cache sector eviction operation supports multiple, simultaneous write operations from RW cache sectors to physical sectors. If enough RW cache sectors are to be written to the block-access memory at once, then the data stored in the RW cache sectors will be spread across multiple block-access memories so as to maximize write bandwidth.

Figure 14:
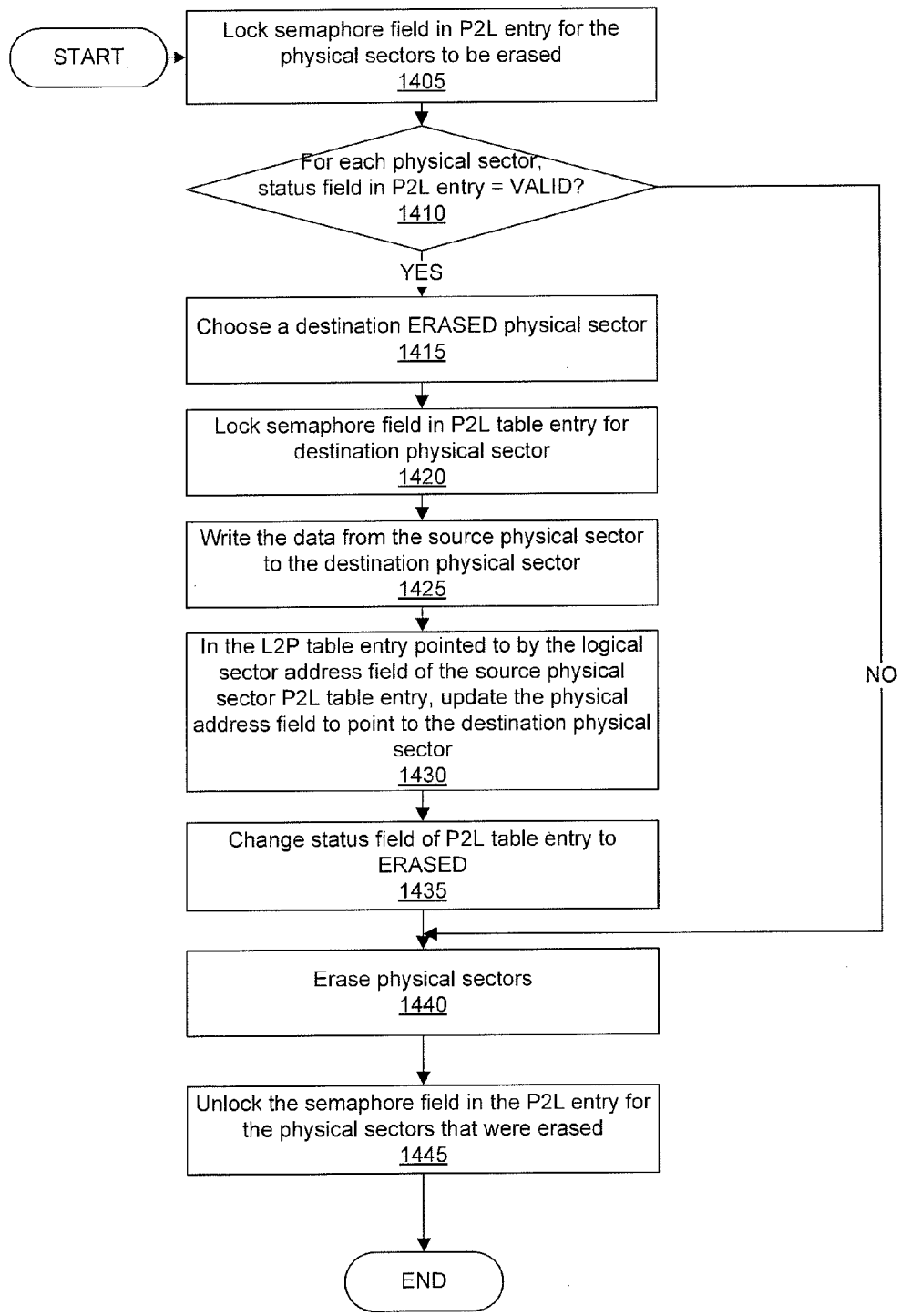
FIG. 14 is a simplified flow diagram illustrating an embodiment of a physical sector erase operation performed by the device manager.

FIG. 14 is a simplified flow diagram illustrating an example of a physical sector erase operation 1220 performed by embodiments of the present invention. A background processing engine can lock the semaphore field in the P2L entry for each physical sector to be erased (1405). The background processing engine determines the status for each physical sector to be erased (1410). If the value of the status field of the P2L table entry of the physical sector to be erased is VALID, the physical sector stores data that must be copied to a second physical sector before the first physical sector can be erased.

If the status field of the P2L entry table of the physical sector is valid, the background processing engine selects a destination physical sector that is available for data storage (e.g., a value of an associated status field is ERASED) (1415). The background processing engine locks the semaphore field in the P2L entry for the destination physical sector (1420). The background processing engine writes the data in the source physical sector to the destination physical sector (1425). Then, in the L2P table entry pointed to by the logical sector address field of the source physical sector P2L table entry, the background processing engine updates the physical sector address field to point to the destination physical sector (1430).

The background processing engine also changes the status field of the source physical sector P2L entry to ERASED, if necessary (1435). For example, for each physical sector being erased, if the value of the status field is ERASED or BAD, no action is necessary. If the value of the status field is OBSOLETE, the background processing engine changes the value of the status field to ERASED. If the value of the status field indicates that the status is VALID, an error has occurred and error handling is performed. Then, the background processing engine erases the contents of the physical sectors (1440). Finally, the background processing engines unlock the semaphore field in the P2L entry for the physical sectors that were erased (1445).

An Example Computing Environment

Elements of network architecture 100 can be implemented using a variety of computer systems and networks. An example of one such computing environment is described below with reference to FIG. 1.

Figure 15:
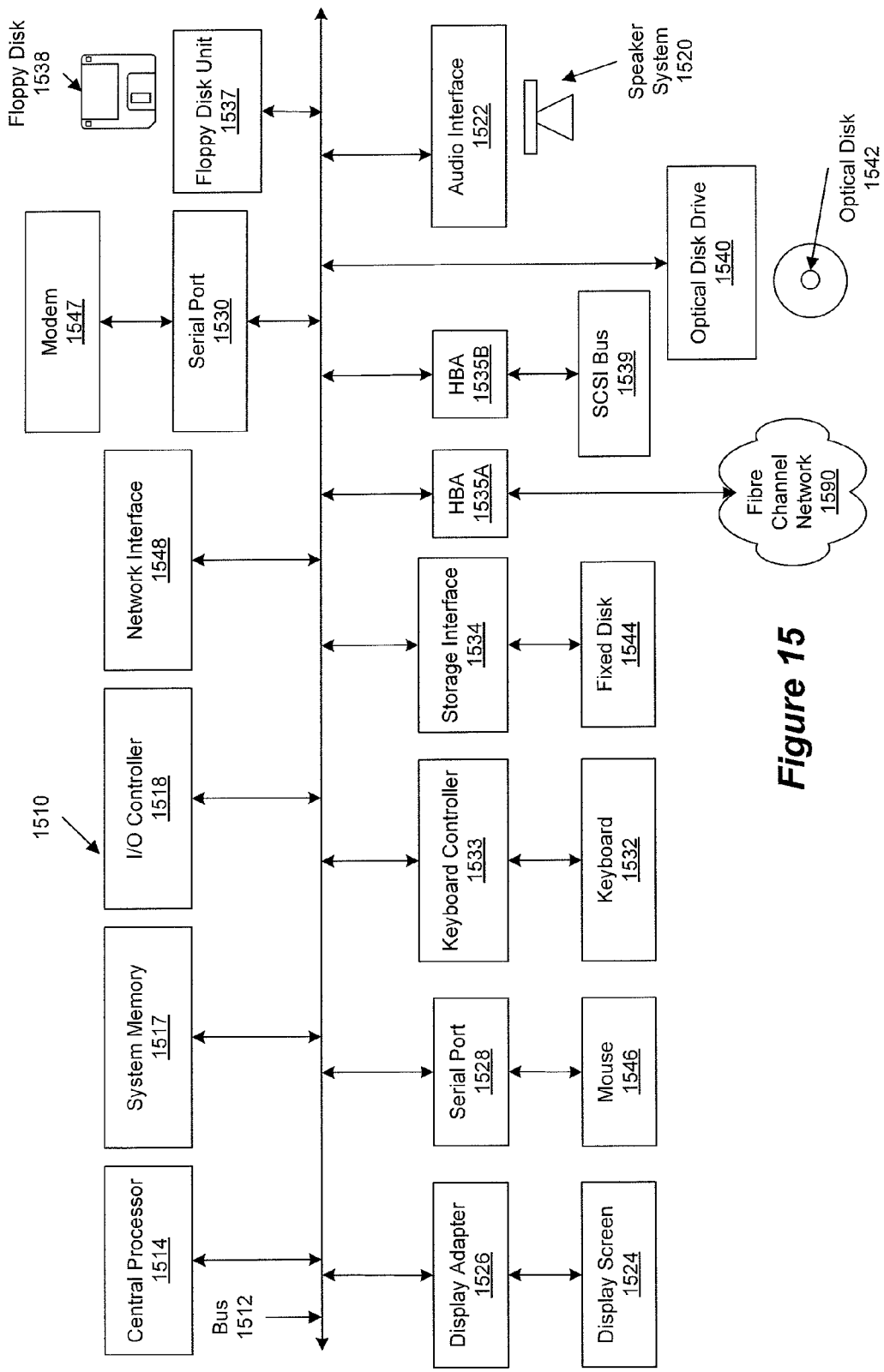
FIG. 15 is a simplified block diagram that illustrates an embodiment of a computer system suitable for implementing embodiments of the present invention.

FIG. 15 depicts a block diagram of a computer system 1510 suitable for implementing a server (e.g., host 115), as well as clients (e.g., clients 105(1)-105(N)) used herein. Computer system 1510 includes a bus 1512, which interconnects major subsystems of computer system 1510, such as a central processor 1514, a system memory 1517 (typically random-access memory (RAM), but which may also include read-only memory (ROM), flash ROM, or the like), an input/output controller 1518, an external audio device, such as speaker system 1520 via an audio output interface 1522, an external device, such as a display screen 1524 via display adapter 1526, serial ports 1528 and 1530, a keyboard 1532 (interfaced with keyboard controller 1533), a storage interface 1534, a floppy disk drive 1537 operative to receive a floppy disk 1538, a host bus adapter (HBA) interface card 1535A operative to connect with a Fibre Channel network 1590, a host bust adapter (HBA) interface card 1535B operative to connect to a SCSI bus 1539, and an optical disk drive 1540 operative to receive an optical disk 1542. Central processor 1514 can execute instructions stored on a computer-readable storage medium such as system memory 1517, floppy disk 1538, optical disk 1542, or a hard disk drive (e.g., fixed disk 1544), and the like. Embodiments of device manager 125, device manager 300, dispatch logic 305, command processing engines 315, and background processing engines 320 of can be stored within the aforementioned computer-readable storage medium and coordinate execution of data access requests and background processing as described in conjunction with FIG. 7-14, via execution of instructions by central processor 1514.

Also included are a mouse 1546 (or other point-and-click device, coupled to bus 1512 via serial port 1528), a modem 1547 (coupled to bus 1512 via serial port 1530), and a network interface 1548 (coupled directly to bus 1512). Bus 1512 allows data communication between central processor 1514 and system memory 1517, which may include read-only memory (ROM) or flash memory (neither shown) and random access memory (RAM) (not shown), as previously noted. RAM is generally the main memory into which operating system and application programs are loaded. ROM or flash memory can contain, among other code, the Basic Input-Output system (BIOS) which controls basic hardware operation such as the interaction with peripheral components. Applications resident with computer system 1510 are generally stored on and accessed via a computer-readable medium, such as hard disk drive (e.g., fixed disk 1544), an optical drive (e.g., optical drive 1540), a floppy disk unit 1537, or other storage medium.

Storage interface 1534, as with other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a point-of-presence (POP). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 15 need not be present. The devices and subsystems can be interconnected in different ways from that shown in FIG. 15. The operation of the computer system such as that shown in FIG. 15 is readily known in the art and is not discussed in detail in this application. Code to implement the previously-described features can be stored in computer-readable storage media such as one or more of block-access memory 135 of FIG. 1, system memory 1517, fixed disk 1544, optical disk 1542, or floppy disk 1538. The operating system provided on computer system 1510 may be MS-DOS®, MS-WINDOWS®, OS/2®, UNIX®, Linux®, or other known operating system.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. The processes described herein can also be implemented by a variety of processors, including application-specific integrated circuits (ASICs) and field-programmable gate arrays (FPGAs).

What is claimed is:

1. An apparatus comprising:
 a plurality of block-access memory devices, wherein each of the plurality of block-access memory devices is configured to store data at one or more physical sector addresses, wherein each of the plurality of block-access memory devices comprises a plurality of pages, and wherein each of the plurality of pages comprises a plurality of physical sectors addressed by physical sector addresses;
 a random-access memory device storing a logical-to-physical (L2P) address translation data structure and a physical-to-logical (P2L) address translation data structure, wherein the L2P address translation data structure stores information identifying every logical sector address currently in use within the plurality of block-access memory devices, and wherein the P2L address translation structure stores information individually identifying every physical sector address currently in use within the plurality of block-access memory devices; and a device manager, coupled to the block-access memory device and the random-access memory, and configured to:

select a physical sector address in the block-access memory device, in response to a write data access request, wherein the write data access request comprises a logical sector address, and wherein the physical sector address is selected in response to the physical sector addressed by the physical sector address being located within an idle one of the plurality of block-access memory devices, using a field in the P2L address translation structure that indicates that the physical sector is not currently being accessed; and access the L2P address translation data structure to associate the logical sector address with the physical sector address.

2. The apparatus of claim 1, wherein, in response to a read data access request, the device manager is further configured to map a second logical sector address to a second physical sector address using the L2P address translation data structure and to retrieve data stored at the second physical sector address.

3. The apparatus of claim 2, wherein the device manager is further configured to:

retrieve data stored at one or more physical sector addresses adjacent to the determined physical sector address; and store the data in a cache memory.

4. The apparatus of claim 1, wherein the device manager is further configured to:

write data to the physical sector address.

5. The apparatus of claim 1, wherein the device manager is further configured to:

access a status field of an entry of the L2P address translation data structure corresponding to the logical sector address to determine a status of the logical sector address in response to the write data access request comprising the logical sector address; and if the status of the entry of the L2P address translation data structure indicates that the second logical sector address does not have a corresponding physical sector address in the block-access memory device, store data corresponding to the write data access request in a cache memory, wherein the physical sector address is selected by the device manage when the data corresponding to the write data access request is evicted from the cache memory, update the status field of the entry of the L2P address translation data structure to indicate that corresponding data is stored only in the cache memory, and update a cache address field of the entry of the L2P address translation data structure to indicate a storage location of the corresponding data within the cache memory.

6. The apparatus of claim 1, wherein the device manager is further configured to:

access a status field of an entry of the L2P address translation data structure corresponding to the logical sector address to determine a status of the logical sector address in response to the write data access request comprising the logical sector address; and if the status field of the entry of the L2P address translation data structure indicates a prior copy of the data corresponding to the logical sector address is stored only in a cache memory, store data corresponding to the write data access request in the cache memory, wherein the physical sector address is selected by the device manage when the data corresponding to the write data access request is evicted from the cache memory.

7. The apparatus of claim 1, wherein the device manager is configured to:

access a status field of an entry of the L2P address translation data structure corresponding to the logical sector address to determine a status of the logical address; and if the status field of the entry of the L2P address translation data structure indicates that a prior copy of the data corresponding to the logical sector address is stored at least in the block-access memory device:

set a status field of a corresponding entry in the P2L address translation data structure to indicate the prior copy of data corresponding to the logical sector address stored in the block-access memory device is out-of-date, store data corresponding to the write request in a cache memory, wherein the physical sector address is selected by the device manage when the data corresponding to the write data access request is evicted from the cache memory, update the status field of the entry of the L2P address translation table to indicate that the data is stored only in the cache memory, and update a cache address field of the entry of the L2P address translation table to indicate a storage location of the data within the cache memory.

8. The apparatus of claim 1, wherein the device manager comprises a background processing engine, wherein the background processing engine is configured to compare a number of blank physical sectors among the plurality of physical sectors to a predetermined threshold, and erase the number of obsolete physical sectors among the plurality of physical sectors to maintain a number of blank physical sectors greater than or equal to the predetermined threshold, responsive to the comparing.

9. The apparatus of claim 8, wherein the background processing engine, prior to the erasing, is further configured to access a status field of an entry of the P2L address translation data structure, wherein the entry of the P2L address translation data structure corresponds to a physical sector of the block-access memory device, and if the status field indicates that data stored in the corresponding physical sector is valid, the data is copied to another physical sector within the block-access memory device.

10. The apparatus of claim 1, wherein the random-access memory further comprises:

a cache memory further comprising a plurality of cache sectors, and the device manager is further configured to select a plurality of cache sectors that correspond to consecutive logical addresses for eviction from the cache memory to the block-access memory device.

11. The apparatus of claim 10, wherein the eviction is a single-page write to the block-access memory device.

12. A method comprising:
    receiving a write data access request, wherein the write data access request comprises a logical sector address; and
    selecting, using a physical-to-logical (P2L) address translation structure stored in a random-access memory device, a physical sector address of a physical sector in one of a plurality of block-access memory devices, in response to receiving the write data access request, wherein the physical sector address is selected in response to the physical sector being located within an idle one of the plurality of block-access memory devices, using a field in the P2L address translation structure that indicates that the physical sector is not currently being accessed, wherein each of the plurality of block-access memory devices comprises a plurality of pages, wherein each of the plurality of pages comprises a plurality of physical sectors addressed by physical sector addresses, and wherein the P2L address translation structure stores information individually identifying every physical sector address currently in use within the plurality of block-access memory devices; and
    accessing a L2P address translation data structure, stored in the random-access memory device, to associate the logical sector address with the physical sector address, wherein the L2P address translation data structure stores information identifying every logical sector address currently in use within the plurality of block-access memory devices.

13. The method of claim 12, further comprising:
    in response to a read request comprising a second logical sector address:
        mapping a second logical sector address to a second physical sector address, using the L2P address translation data structure, and retrieving data stored at the second physical sector address.

14. The method of claim 13, further comprising:
    retrieving data stored at one or more physical sector addresses adjacent to the second physical sector address; and
    storing the data in a cache memory.

15. The method of claim 12, further comprising:
    writing data to the determined physical sector address.

16. The method of claim 12, further comprising:
    comparing a number of blank physical sectors among a plurality of physical sectors in the plurality of block-access memory devices to a predetermined threshold; and
    erasing the number of obsolete physical sectors among the plurality of physical sectors to maintain a number of blank physical sectors greater than or equal to the predetermined threshold, responsive to the comparing.

17. The method of claim 16, further comprising:
    accessing a status of an entry of the P2L address translation data structure, and
        the entry of the P2L address translation data structure corresponds to a physical sector of one of the plurality of block-access memory devices, and
    if the status field indicates that the data stored in the corresponding physical sector is valid, copying the data to another physical sector within the plurality of block-access memory devices.

18. The method of claim 12, further comprising:
    selecting a plurality of cache sectors that correspond to consecutive logical sector addresses for eviction from a cache memory to the plurality of block-access memory devices, wherein
        the cache memory further comprises a plurality of cache sectors.

19. The method of claim 18, wherein the eviction is a single-page write to the plurality of block-access memory devices.

20. A system comprising:
    a host; and
    a data storage device, further comprising
        a plurality of block-access memory devices, wherein each of the block-access memory devices is configured to store data at one or more physical sector addresses, wherein each of the block-access memory devices comprises a plurality of pages, and wherein each of the plurality of pages comprises a plurality of physical sectors addressed by physical sector addresses,
        a random-access memory device storing a logical-to-physical (L2P) address translation data structure and a physical-to-logical (P2L) address translation structure, wherein the L2P address translation data structure stores information identifying every logical sector address currently in use within the plurality of block-access memory devices, and wherein the P2L address translation structure stores information individually identifying every physical sector address currently in use within the plurality of block-access memory devices, and
        a device manager, coupled to the block-access memory device and the random-access memory, and configured to:
            select a physical sector address in the block-access memory device, in response to a write data access request, wherein the write data access request comprises a logical sector address, and wherein the physical sector address is selected in response to the physical sector addressed by the physical sector address being located within an idle one of the plurality of block-access memory devices, using a field in the P2L address translation structure that indicates that the physical sector is not currently being accessed; and
            access the L2P address translation data structure to associate the logical sector address with the physical sector address.

21. The apparatus of claim 1, wherein the random-access memory device is a volatile random access memory device.

22. The apparatus of claim 1, wherein the apparatus comprises a background processing engine, and wherein the background processing engine is configured to access all of the P2L address translation data structure when selecting blocks within the block-access memory device for erasure.

23. The apparatus of claim 1, wherein the device manager is configured to select a new physical sector address of a new block in the block-access memory device to which to write new data for a first logical sector address from all of the physical sector addresses identified in the P2L address translation data structure.

* * * * *